United States Patent [19]

Jones

[11] Patent Number: 4,526,414

[45] Date of Patent: Jul. 2, 1985

[54] FOLDABLE CARRYING DEVICE

[76] Inventor: Bobby L. Jones, 19333 Ilene, Detroit, Mich. 48221

[21] Appl. No.: 571,356

[22] Filed: Jan. 16, 1984

[51] Int. Cl.³ .................... A47J 51/084; A45C 13/26
[52] U.S. Cl. .................................... 294/143; 294/146
[58] Field of Search ............... 294/147, 143, 917, 198, 294/146; 248/97, 168; 211/606, 16, 198

[56] References Cited

U.S. PATENT DOCUMENTS

| | | | |
|---|---|---|---|
| 517,408 | 3/1894 | Lasar | 294/143 |
| 892,214 | 6/1908 | Bennet | 294/143 |
| 1,176,486 | 3/1916 | Peter | 294/143 |
| 2,987,109 | 6/1961 | Sohmer | 294/143 |
| 2,999,622 | 9/1961 | Durham | 294/143 |
| 3,164,256 | 1/1965 | Bennett | 294/147 |
| 3,483,996 | 12/1969 | Scammon | 294/143 |
| 4,014,466 | 3/1977 | Wess et al. | 294/143 |
| 4,036,416 | 7/1977 | Lowe | 294/143 |
| 4,133,467 | 1/1979 | Mackniesh | 294/143 |
| 4,170,801 | 10/1979 | Ward | 224/922 |
| 4,274,571 | 6/1981 | Lafreniere et al. | 294/147 |

*Primary Examiner*—James B. Marbert
*Attorney, Agent, or Firm*—Harness, Dickey & Pierce

[57] ABSTRACT

A foldable carrying device which may be readily adapted for carrying a wide variety of different tubular members, such as fishing rods, rolled blueprints, flourescent lighting tubes and the like. Readily detachable clip members are provided for adapting the device to tubular members of different diameters. The carrying device includes first and second panel members hingedly connected to form an inverted v-shaped foldable frame, and includes integrally formed compartment or compartments for storage and transporting of small loose items, such as fishing tackle, drafting equipment, small hand tools, parts, and the like.

18 Claims, 6 Drawing Figures

U.S. Patent   Jul. 2, 1985   4,526,414
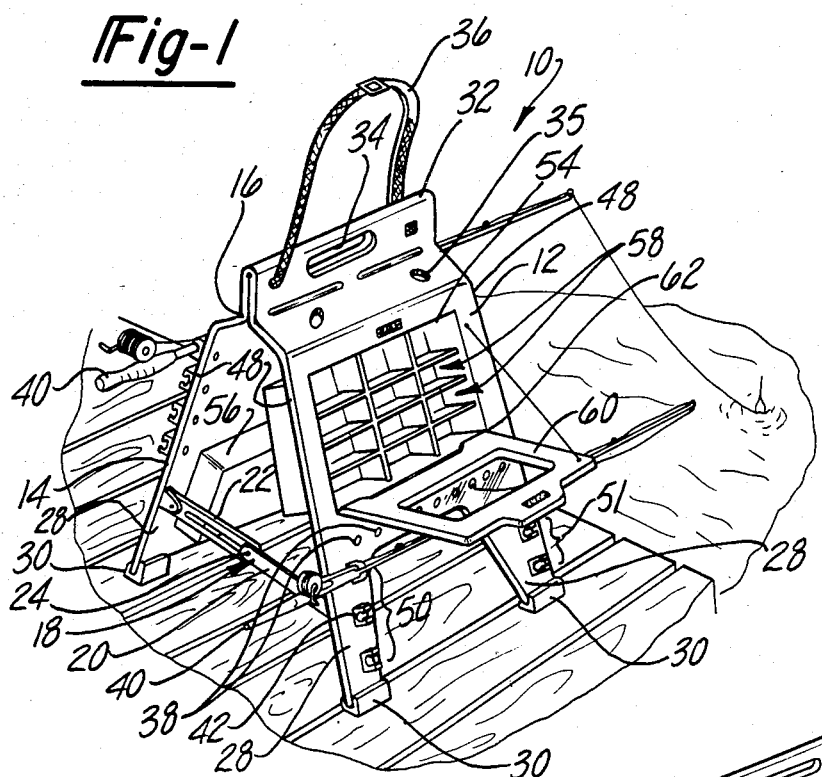
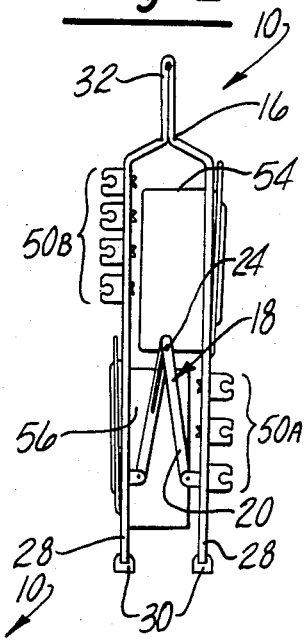
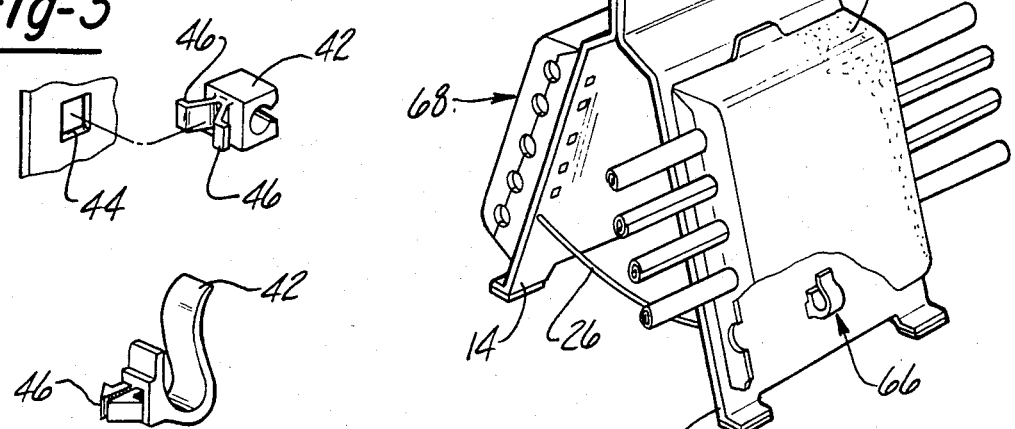
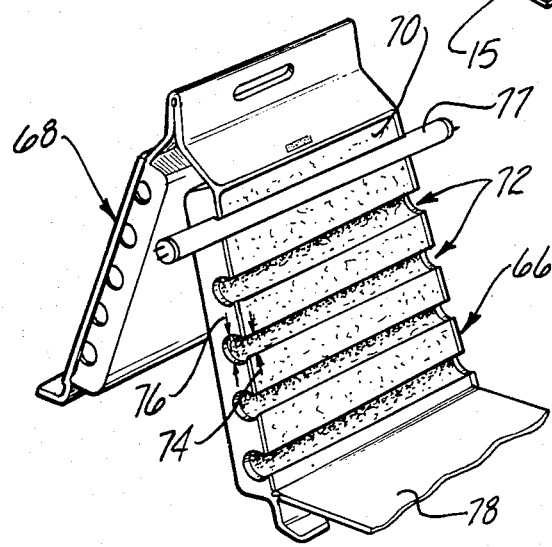

FOLDABLE CARRYING DEVICE

BACKGROUND OF THE INVENTION

1. Field of the Invention

The present invention relates generally to a carrying device, and more particularly to a foldable carrying device for supporting and carrying elongated tubular members, such as fishing rods, flourescent lighting tubes, blueprints and the like, in spaced relationship to one another. The invention further relates to a foldable carrying device having readily detachable clip members for adapting the device to tubular members of different diameters, and having an integrally formed compartment for storage and transporting of small loose items, such as fishing tackle, drafting equipment, small hand tools and parts, and the like.

2. Description of the Prior Art

Over the years there have been a number of devices proposed for the carrying and displaying of elongated tubular members such as fishing poles, gold clubs, rolls of wire screen material, and the like. As an example of known carrying devices for fishing poles, reference may be had to U.S. Pat. No. 4,014,466 to Wess entitled "Carrying Frame For Fishing Poles", issued Mar. 29, 1977; also to U.S. Pat. No. 4,170,801, to Ward, entitled "Fishing Rod And Reel Box", issued Oct. 16, 1979. As an example of a device for carrying golf clubs reference may be had to U.S. Pat. No. 4,036,416 to Lowe entitled "Combination Foldable Golf Club Carrier and Scorekeeping Device", issued July 19, 1977; and U.S. Pat. No. 4,133,467 to Mackniesh, entitled "Golf Club Carrier", issued Jan. 9, 1979. As an example for a device displaying rolled wire screen material reference may be had to U.S. Pat. No. 517,408 to Lasar, entitled "Wire Cloth Holder", issued Mar. 27, 1894; and to U.S. Pat. No. 892,214 to Bennett, entitled "Wire Screen Cloth Rack", issued June 30, 1908; and further to U.S. Pat. No. 1,176,486 to Peter, entitled "Wire Holding Stand", issued Mar. 21, 1916.

While the foregoing devices have no doubt served useful purposes, none of these prior art devices are readily adaptable for use is carrying and supporting a wide range of different types of tubular members. For example, while the Wess Carrying Frame For Fishing Poles is reasonably suited to the task of carrying fishing poles, it is not at all suited for carrying rolled paper blueprints, for example. Similarly, the Bennet Wire Screen Cloth Rack is quite unsuitable for transporting and supporting fishing poles.

Aside from being designed with one narrow purpose or limited usage in mind, the prior art carrying devices have proven relatively expensive to manufacture in mass production. Prior art devices do not use standardized components which are readily adaptable to a wide variety of different uses. Hence, for example, a carrying device for fishing poles has heretofore required one construction and design, while a carrier for rolled materials such as blueprints, has required a completely different construction and design.

For the manufacturer of carrying devices this prior art approach is quite unsuitable. Until now, if a manufacturer wished to offer a full line of carrying devices for tubular members ranging from fishing poles to rolled blueprints, the manufacturer would have to maintain separate production lines for each type or class of tubular member carriers. Because carrying devices of the prior art have traditionally been designed with one specific use in mind, very few interchangeable parts have heretofore been available.

SUMMARY OF THE INVENTION

The present invention represents a vast improvement over prior art carrying devices by providing a convenient, economical and aesthetically pleasing foldable carrying frame which may be readily adapted, either by the manufacturer or by the end user, to cover a wide range of uses. The carrying device of the present invention may be quickly and easily outfitted to serve as an ideal carrying frame for transporting and storing fishing rods and fishing tackle. The frame, when opened out into its inverted V-shaped supporting position, is sturdy and stable enough to support several fishing poles for still fishing on docks, piers and banks.

The carrying device may be alternatively outfitted, quite easily, to serve as a rolled blueprint carrier, simply by exchanging the snap-in fishing rod holding clips for snap-in blueprint holding clips. In general, the snap-in clips may be manufactured in a wide range of sizes to accommodate many different diameters. As a blueprint carrying device a readily attachable simulated briefcase cover may be installed to protect the midsections of the blueprints from collision with the body of the person transporting the blueprints. In addition, the briefcase cover gives the carrying device a professional, finished appearance which is considered to be highly desireable for use by executives, traveling salesmen and for use in business meetings and presentations.

Accordingly, the present invention provides a foldable apparatus for supporting and carrying elongated tubular members comprising first and second frame defining panel members, hingedly joined to one another for movement between a relatively open supporting position and a relatively closed carrying position. In the open supporting position, the panel members are in a generally inverted V-shaped configuration, while in the closed carrying position, the panel members are in a generally parallel configuration. A cross member is coupled between the panel members and serves to determine the angular relationship of the panel members when the frame is opened into the inverted V-shaped configuration. Readily detachable clip members are secured to at least one of the panel members for resiliently capturing and holding the tubular members to be transported. The clip members are resiliently captured within openings formed in the panel member or members for easy snap-out and snap-in exchanging of one clip member for another.

The invention further comprises a compartment defining means having at least a portion thereof being integrally formed in at least one of the panel members. If desired, both panel members may be provided with compartment defining means which are disposed in staggered relationship to one another. Moreover, the clip members may also be arranged or grouped together in a first plurality, disposed on the first panel member, and a second plurality disposed on the second panel member. Preferably the first and second pluralities are in staggered relationship to one another.

For a more detailed understanding of the invention, its objects and advantages, reference may be had to the following specification and to the accompanying drawings.

BRIEF DESCRIPTION OF THE DRAWINGS

FIG. 1 is a perspective view of a first embodiment of the invention in its open supporting position, illustrating the invention in use as an apparatus for supporting and carrying fishing poles;

FIG. 2 is an end view of the apparatus of FIG. 1, shown in the closed carrying position;

FIG. 3 is a detailed view illustrating one embodiment of snap-in clip member in accordance with the invention;

FIG. 4 is a similar view of another embodiment of snap-in clip member in accordancce with the invention;

FIG. 5 is a perspective view of the invention in its open supporting position illustrating the invention in use as a supporting and carrying apparatus for rolled tubular members such as blueprints, for example;

FIG. 6 is a fragmentary perspective view illustrating another embodiment of the invention useful in carrying tubular members such as flourescent lighting tubes.

DESCRIPTION OF THE PREFERRED EMBODIMENTS

Referring first to FIGS. 1 and 2, a foldable carrying frame adapted for carrying fishing rods is illustrated. The foldable frame 10 comprises first and second substantially planar panel members 12 and 14, hingedly joined together as at hinged connection 16. Panel members 12 and 14 are movable about hinged connection 16 between a relatively open supporting position (shown in FIG. 1) in which the panel members are in a generally inverted V-shaped configuration, and a relatively closed carrying position (shown in FIG. 2) wherein the panel members are in a generally parallel configuration. A cross member 18 is coupled between panel members 12 and 14 and serves to determine the angular relationship of panel members 12 and 14 when opened into the inverted V-shaped configuration. Preferably cross member 18 comprises first cross member 20, hingedly connected to panel member 12, and second cross member 22, hingedly connected to panel 14. First and second cross members 20 and 22 define an articulated connection 24 which autmotically articulates or bends upwardly upon lifting of frame 10 to permit panel members 12 and 14 to move toward the closed carrying position. In the alternative, cross member 18 may comprise a flexible cross member 26, such as rope, cable, chain or the like, illustrated in FIG. 5. Cross member 26, like articulated cross members 20 and 22, autmatically disengages upon lifting of the frame to permit the panel members to move toward the closed carrying position.

Panel members 12 and 14 may be molded from a plastic material or other suitable material to have the general shape illustrated in FIGS. 1 and 2. Preferably panel members 12 and 14 are each formed with a pair of legs 28 having rubber feet 30. Hinged connection 16 may become for example, a living hinge formed during the formation of panel members 12 and 14. Panel members 12 and 14 may further be integrally formed to include a folded over top portion 32 which is provided with a handle cut-out 34. If desired, an adjustable strap 36 may be secured to the top portion 32 to provide an alternate means for carrying the foldable frame.

Panel members 12 and 14 are further provided with a plurality of anchor holes 38, which may be used to secure objects to the outside of the frame. In the fishing pole carrying embodiment, for example, anchor holes 38 serve as a convenient place for inserting fishing hooks for transportation and storage of the fishing poles 40. More specifically, anchor holes 38 allow the fisherman to secure the end of the fishing line, to prevent lines from becoming tangled, by simply inserting the fish hook at the end of the line into one of the anchor holes. Then by tightening the fishing line using the reel's anti-reverse locking mechanism, the fishing line may be drawn taught so that it will not become entangled with other lines.

The invention further comprises clip members 42 which may be readily detachably secured to at least one of the panel members 12 and 14. The clip members, two embodiments of which are illustrated in greater detail in FIGS. 4 and 5, are preferably secured to panel members 12 and 14 by spring locking engagement within a plurality of square or rectangular openings 44 formed in the panel members 12 and 14. Preferably clip members 42 include relatively resilient flanges 46 which spring outwardly to grip the periphery of openings 44 when inserted. By utilizing rectangular or square openings 44, clip members 42 will not rotate about the axis of the opening 44, although clip members 42 may be inserted in any one of the four possible ninety degree orientations. In order to make the carrying device more versatile, clip members 42 may be fabricated in a number of different configurations and sizes. Two such configurations are exemplified in FIGS. 3 and 4. Naturally, it will be understood that a wide variety of different clip member configurations is possible without departing from the scope of the invention as set forth in the following claims.

Openings 44 may be disposed at a wide variety of locations on panel members 12 and 14 to implement different carrying frame embodiments. In FIGS. 1 and 2, for example, opening 44 are disposed along the outer side edges 48 of panel members 12 and 14 in generally vertically aligned groups 50 and 51. In general, each clip member 42 within group 50 has a corresponding clip member in horizontal alignment therewith within group 51. Thus a tubular member, such as fishing pole 40, may be clipped between two horizontally aligned clip members, to hold the tubular member in a generally horizontal position. In the alternative, by the appropriate selection of clip members, a tubular member may be secured between non-horizontally aligned clip members, in order to hold the tubular member in a non-horizontal position. If necessary, special angulated clip members may be provided for this purpose, or openings 44 may be fashioned as polygons having more than four sides, to permit the clip members to be locked in spatial dispositions other than the four ninety degree dispositions denoted above.

In the opened supporting position, frame 10 provides a stable base which will support itself and the tubular members secured thereto without tipping. The frame's stability permits the frame to be used to hold fishing poles while still fishing on a dock, pier or bank, as illustrated in FIG. 1. Rubber feet 30 prevent the frame from being pulled into the water when a fish strikes the bait.

The invention further comprises a compartment 54 integrally formed in at least one of the panel members. In FIGS. 1 and 2 compartment 54 is illustrated as integrally formed in panel member 12. Preferably a second integrally formed compartment 56 is formed in panel member 14. Each of the compartments 54 and 56 may be divided or segmented into a number of smaller internal compartments. Preferably each compartment 54 and 56 is provided with a lid 60, hingedly connected to the panel member along the lower edge 62 of the compartment so that the lid swings downwardly to form a platform for sorting small objects such as fishing tackle or the like. Lid 60, when fully opened, is held in a substantially horizontal plane by means of guy wire 64 or the like. If desired, lid 60 may be fabricated from a transparent material so that the contents of internal compartments 58 may be viewed when the lid is closed.

As best seen in FIG. 2, compartments 54 and 56 are vertically staggered with respect to one another to maximize the compartment depth without interference when the frame is in its closed position. Likewise, the vertically aligned group of clip members 50A on panel member 12 is vertically staggered with respect to vertically aligned group 50B on panel member 14. This arrangement permits a maximum number of individual clip members to be installed on both panel members without interferring with the opening and closing of the compartment lids.

Frame 10 may also be provided with one or more enlarged oval or eliptically shaped openings 35 in at least one of panel members 12 and 14 which serve as openings for receiving and holding the butt end or handle end of a fishing pole, to support the fishing pole while still fishing.

Two alternate embodiments of the invention are illustrated in FIGS. 5 and 6. These alternate embodiments are useful, for example, in storing and carrying other types of tubular members such as rolled blueprints, flourescent light tubes and the like. The embodiments of FIGS. 5 and 6 utilize the same foldable frame 10 described above, and include modified compartments 66 and 68, which may be integrally formed on panel members 12 and 14, or held in place using resilient flanges for insertion into openings, similar to the way in which clip members 42 are secured. Compartments 66 and 68 may be disposed outwardly of the panel members 12 and 14, as illustrated in FIG. 5, or they may be disposed inwardly, as illustrated in FIG. 6. As shown in FIG. 6, if desired, compartments 66 and 68 may be filled with a foam insert 70, which is provided with a plurality of cylindrical, tubular member receiving slotted openings 72. As shown in FIG. 6, slotted openings 72 have a narrower surface aperture 74 than the internal cylindrical diameter 76. The foam insert 70 thus serves to resiliently grasp the tubular member, such as flourescent lighting tubes 77, and to protect it from damage or breakage by absorbing shock.

Preferably modified compartments 66 and 68 are provided with lids 78 which are fashioned to simulate the appearance of a briefcase.

While the above description constitutes the preferred embodiments of the present invention, it will be appreciated that the invention is susceptible to modification, variation and change without departing from the proper scope or fair meaning of the accompanying claims.

I claim:

1. A foldable apparatus for supporting and carrying elongated tubular members comprising first and second frame defining panel members hingedly joined to one another for movement between a relatively open supporting position wherein said panel members are in generally inverted V-shaped configuration and a relatively closed carrying position wherein said panel members are in generally parallel configuration;

said panel members being integrally joined together at the vertex of said V-shaped configuration to define an outwardly protruding handle portion which defines an opening for grasping;

said panel members further including a plurality of ground engaging legs integrally formed in said panels and extending generally away from said outwardly protruding handle portion;

cross member means coupled between said panel members for determining the angular relationship of said panel members in said inverted V-shaped configuration; and interchangable clip members detachably secured to at least one of said panel members for capturing and holding said tubular members, at least one of said panel members having a plurality of openings, and said clip members including resilient and deflectable flanges insertable into and engagable with said openings for removably attaching said clip members to said panel member.

2. The apparatus of claim 1 further comprising compartment defining means secured to at least one of said panel members.

3. The apparatus of claim 2 wherein said compartment defining means includes a lid hingedly secured thereto.

4. The apparatus of claim 1 wherein said first and second panel members are joined with a living hinge.

5. The apparatus of claim 1 wherein said cross member means automatically disengages upon lifting of said frame to permit said panel members to move toward said closed carrying position.

6. The apparatus of claim 1 further comprising carrying handle integrally formed and defined by said panel members.

7. The apparatus of claim 1 wherein said panel members define a plurality of feet.

8. The apparatus of claim 1 wherein a first plurality of clip members is detachably secured to said first panel member, and a second plurality of clip members is detachably secured to said second panel member, such that said first plurality and said second plurality are in staggered relationship to one another.

9. An apparatus for supporting and carrying fishing poles in accordance with claim 1 wherein at least one of said panel members is provided with a plurality of anchor means for receiving fish hooks.

10. An apparatus for supporting and carrying fishing poles in accordance with claim 1 wherein at least one of said panel members includes at least one orifice for holding the handle end of a fishing pole to support said fishing pole.

11. A foldable apparatus for supporting and carrying elongated tubular members comprising first and second frame defining panel members hingedly joined to one another for movement between a relatively open supporting position wherein said panel members are in generally inverted V-shaped configuration and a relatively closed carrying position wherein said panel members are in generally parallel configuration;

said panel members being integrally joined together at the vertex of said V-shaped configuration to define an outwardly protruding handle portion which defines an opening for grasping;

said panel members further including a plurality of ground engaging legs integrally formed in said panels and extending generally away from said outwardly protruding handle portion;

cross member means coupled between said panel members for determining the angular relationship of said panel members in said inverted V-shaped configuration;

means for holding said tubular members; and first rigid compartment defining means having at least a portion thereof being integrally formed in said first panel member, said first panel member having an inner face directed generally toward said second panel member and defining an opening for accessing said compartment defining means;

wherein said compartment defining means protrudes from said inner face generally toward said second panel member so that when said apparatus is in said open supporting position the center of gravity of said compartment defining means is laterally within the confines of the area defined by the points of contact of said legs with the ground, thereby providing a stable structure which will not tip over.

12. The apparatus of claim 11 wherein said first compartment defining means includes a lid portion hingedly secured to said first panel member along the lower edge of said access opening, said lid portion being provided with stop means for holding said lid in an opened generally horrizontal self-forming position.

13. The apparatus of claim 11 wherein said first compartment defining means includes openings through which said tubular members may be received.

14. The apparatus of claim 11 wherein said means for holding said tubular members includes clip members for resiliently holding said tubular members.

15. The apparatus of claim 11 further comprising second compartment defining means having at least a portion thereof being integrally formed in said second panel member.

16. The apparatus of claim 15 wherein said first and second compartment defining means are disposed in staggered relationship.

17. An apparatus for supporting and carrying fishing poles in accordance with claim 11 wherein at least one of said panel members is provided with a plurality of anchor means for receiving fish hooks to prevent fishing lines from becoming tangled.

18. An apparatus for supporting and carrying fishing poles in accordance with claim 11 wherein at least one of said panel members includes at least one orifice for holding the handle end of a fishing pole to support said fishing pole.

* * * * *